United States Patent [19]

Seguin

[11] Patent Number: 4,655,278
[45] Date of Patent: Apr. 7, 1987

[54] HEAT RECIRCULATION APPARATUS AND METHOD

[75] Inventor: Michael Seguin, Cambridge, Canada

[73] Assignee: Cambridge Manufacturing Climate Control Products Inc., Cambridge, Canada

[21] Appl. No.: 780,837

[22] Filed: Sep. 27, 1985

[51] Int. Cl.4 .................. F25B 29/00; F25D 17/08
[52] U.S. Cl. ........................... 165/2; 165/29; 165/48.1; 165/59; 62/238.6; 62/324.1; 62/325; 62/411; 62/412
[58] Field of Search ............. 165/29, 48.1, 16, 2, 165/59; 62/410, 411, 412, 324.1, 325

[56] References Cited

U.S. PATENT DOCUMENTS

| | | | |
|---|---|---|---|
| 2,243,478 | 5/1941 | Knoy | 165/29 |
| 2,401,560 | 6/1946 | Graham et al. | 165/29 |
| 2,466,383 | 4/1949 | Cody | 62/325 |
| 2,468,626 | 4/1949 | Graham | 165/29 |
| 2,619,326 | 11/1952 | McLenegan | 165/29 |
| 2,672,734 | 3/1954 | Ditzler et al. | 165/29 |
| 2,726,067 | 12/1955 | Wetherbee et al. | 165/29 |
| 3,366,169 | 1/1968 | Laing | 165/48.1 |
| 3,692,100 | 9/1972 | Gallagher, Jr. | 165/29 |
| 4,071,080 | 1/1978 | Bridgers | 62/412 |
| 4,100,763 | 7/1978 | Brody | 62/412 |
| 4,478,048 | 10/1984 | Dills | 165/16 |
| 4,478,053 | 10/1984 | Yano et al. | 62/325 |
| 4,566,531 | 1/1986 | Stolz | 62/325 |
| 4,592,413 | 6/1986 | Sugita et al. | 165/59 |

FOREIGN PATENT DOCUMENTS

| | | | |
|---|---|---|---|
| 1168226 | 5/1984 | Canada | 165/29 |
| 3405584 | 8/1985 | Fed. Rep. of Germany | 165/59 |

Primary Examiner—William R. Cline
Assistant Examiner—John K. Ford
Attorney, Agent, or Firm—George A. Rolston

[57] ABSTRACT

A method and apparatus are disclosed for simultaneously regulating the temperature of interior air, and ventilating the interior air with air from outside by means of passing said interior air through an interior heat exchanger, simultaneously passing outside air through an outside heat exchanger, extracting a portion of the inside air, and directing it to the outside air for venting outside, simultaneously extracting a portion of the outside air and venting it to the inside air, continuously passing a heat exchange medium into one of the heat exchangers, and transferring the heat exchange medium from one heat exchanger to the other heat exchanger, via an expansion device to procure transfer of heat from one heat exchanger to the other, and passing the heat exchange medium through flow controls, responsive to temperature of the inside air, to selectively direct flow of medium either to one of the heat exchangers or to the other. Also disclosed is a method of regulating temperature by means of the system. The invention relates to heat exchanger apparatus, and in particular to such a heat exchanger operable all year round, for heating a building during the cool season, and cooling a building during the hot season.

13 Claims, 5 Drawing Figures

HEAT RECIRCULATION APPARATUS AND METHOD

BACKGROUND OF THE INVENTION

Simple heat pumps have been in use in a wide variety of applications, typically as being so called air conditioners, for cooling a building during hot months. The typical air conditioner collects heat from air circulating inside the building, transfers the heat to air circulating outside the building, and thereby cools the interior of the building.

In most of these applications air within the building is simply circulated back into the building. Air outside the building is simply circulated back into the outside atmosphere.

Similarly, heat pumps are used in reverse. Thus heat may be collected from the air outside the building, and transferred to air within the building. In these applications again, air outside the building is simply cycled through a heat pump outside the building and returned to atmosphere. Air within the building is cycled through a heating coil within the building, and returned to the building atmosphere.

In both applications, the actual heat transfer takes place from the outside of the building to the inside of the building, or vice versa, by outside coils physically located outside the building, and inside coils located inside the building.

The inside and outside coils are of course connected by pipes or conduits, and a suitable compressor maintains circulation.

A refrigerant, typically "Freon" (Trade Mark) gas or the like passes through the coils, and physically carries the heat from outside the building to inside, or from the inside to the outside, transferring it from one set of coils to another, via the conduits, and pipes.

These systems have inherent inefficiencies.

In heat exchanger technology, it is well known that the efficiency is proportional to the temperature difference. When it is attempted to operate a heat pump, to collect heat outside the building and transfer it into the building, the efficiency drops substantially as the temperature of the outside air drops. This produces a loss in efficiency at the time of the greatest need for heat input into the building.

The efficiency of an air conditioner will also depend on the temperature of the outside air. As this outside air temperature rises, the efficiency of heat rejection to the atmosphere diminishes, just at the point when the greatest load is placed on the equipment, due to the need for removing heat from the inside of the building.

In spite of these problems however air conditioners are in very wide use, and heat pump technology for recovering heat from the outside air is gaining increasing acceptance. Dual installations, where a single heat exchanger system is used for both functions, are becoming popular.

In fact however due to the loss of efficiency especially in the heat pump cycle, the actual savings in heating costs in the building are quite small.

Domestic heat pumps usually do not operate below a certain preset outside temperature.

An additional factor which must be included in such an equation is the cost of the equipment, and the cost of servicing and replacement.

Heat pumps of all kinds operate most efficiently when they are operated at a fairly stable cycle, and over a predetermined stable temperature range.

Thus for example in the normal household refrigerator, which operates in a very narrow temperature range, it is common for refrigerators to have a useful life up to twenty years.

Household air conditioners such as central air conditioners operate over a much wider temperature range than for example a refrigerator. However the temperature range is relatively stable, and given suitable engineering it is possible to make such a central air conditioning unit have a useful life of up to twenty years.

However, when it is attempted to combine the air conditioning function with a heat pump function, it becomes apparent that the unit will be forced to operate over a very much wider temperature range from say 100° F. in high summer, to −10° F. in winter.

The problems of engineering such a heat pump having such a very broad operating range become much greater. As a result, it is found that the useful life of a combination air conditioner/heat pump installation may well be reduced.

When the cost of replacing this equipment is added to the overall cost equation, it will become apparent that there is in fact little or no saving achieved when using a heat pump, as compared with conventional heating.

In addition to these factors is that in fact the operation both of an air conditioner and a heat pump involve very substantial losses in waste heat.

In the case of the air conditioning cycle, electrical energy is being used to dump heat outside the building, and to circulate large volumes of hot, outside air, through the heat exchanger.

In the heat pump cycle substantial electrical energy is being used to transfer heat from the outside of the building to the inside, and to circulate large volumes of cold outside air through the collector coils outside the building. In addition, a defrost cycle is used in most heat pumps.

The typical household, in addition to requiring air conditioning, in summer and air heating in winter, also requires a supply of domestic hot water. In the typical household hot water is supplied by an electrically powered hot water tank.

This represents additional expense in power consumption. Clearly it is desirable that, whenever possible, excess heat in the building shall be used for heating water, to reduce power consumption for this purpose, at least during the warmer months.

Clearly, it is desirable to provide a heat recirculating apparatus capable of operating both a cooling and a heating cycle, and in which the operating temperature range is greatly reduced, so as to provide a unit having a longer working life and reduce the stresses due to extreme temperature variations, and in which, at the same time, to a large extent the energy values inherent in the operation of the unit are recovered.

For example, during summertime operation at least, it is desirable that some of the heat being rejected to the outside by the operation of the unit, may be recovered and used to heat the domestic hot water supply. This will also reduce the load on the heat exchangers and compressor.

In addition to all of these problems, which are directed solely to the efficiency of heating and cooling the interior of the building such as a home, or the like, is the entirely different problem of maintaining a healthy atmosphere within the building.

Present day domestic air circulating systems make no provision whatever for the venting of stale air to atmosphere, or for the introduction of fresh air from outside.

Domestic construction simply assumes that fresh air will continuously percolate into the building through various cracks, and that stale air will be dissipated in the same way.

As energy costs continuously increase, householders constantly seek ways to improve the thermal insulation of their homes. This includes both additional straightforward insulation in walls, ceilings, windows and the like, but more importantly, it includes more efficient ways of closing cracks and openings in the building. In fact, there are numerous instances of insulation being installed so effectively that the operation of a fossil fuel furnace such as an oil or gas furnace in the home, become inefficient and even dangerous. Cases have arisen where occupiers of a home have in fact been injured or even killed by the accumulation of exhaust fumes and the like from furnaces, caused by incomplete combustion. Clearly, it is obvious that the greater the efficiency of the air percolation barriers in the building, the greater will be the likelihood of problems related to the lack of fresh air.

It is therefore desirable if in the design and construction of a heat recirculating unit of the type described, provision can be made for the continuous venting of a proportion of the building atmosphere, from the inside to the outside of the building, and the continuous introduction of fresh air from the outside, to maintain a fresh healthy atmosphere within the building.

The use of fossil fuels within the home or building may also be eliminated by the use of the unit according to the invention.

In accordance with the invention, all of these objectives are achieved simultaneously in a single unit which both heats and cools the interior of the building in accordance with seasonal requirements, and which also provides a large measure of heat recovery for heating the domestic hot water system, and which also continuously ejects stale air, after extraction of its heating values, introduces fresh air, in an efficient manner producing substantial savings of energy, and which may also recover heat from geothermal sources.

BRIEF SUMMARY OF THE INVENTION

With a view therefore to overcoming the various disadvantages outlined above, and to achieving the objects of the invention, the invention comprises an all-weather heat exchanger for providing both heating and cooling functions at the appropriate seasons, and having a first air flow housing means, and openings for connecting same to receive outside air, and to discharge air to the outside, and fan means for causing air flow therethrough of outside air, second interior air flow housing means, and openings for receiving inside air, and for discharging air to the inside, and fan means for procuring flow of inside air therethrough, first heat exchanger means in said first housing means and second heat exchanger means in said second housing means, and compressor means operable selectively to transfer a heat exchange media from one of said heat exchanger means to the other selectively depending upon the seasons, said compressor having an inlet and an outlet, a domestic hot water heat exchanger in heat exchange relation with the outlet of said compressor, air exchange passage ways arranged between said first and second housing, whereby inlet air can be transferred from the second housing to the first housing, and whereby outside air can be transferred from the first housing to the second housing whereby to procure continuous venting of some inside air and replacement by makeup fresh air from the outside and, heating means in said second housing means to supply makeup heat.

More particular the invention seeks to provide a heat exchanger wherein each said housing defines a zone of negative pressure, and a further zone of positive pressure, and wherein said zone of negative pressure in said first housing is located adjacent to said zone of high pressure in said second housing and wherein said zone of low pressure in said second housing is located adjacent said zone of high pressure in said first housing, and including transfer port means between said adjacent zones, and means for regulating air flow through said transfer port means, to procure flow of air therethrough.

More particularly, it is an objective of the invention to provide heat recirculating apparatus having the foregoing advantages, wherein a single compressor is provided, and having a reversing value connected between the compressor and both said coils, and also connected to be operated by said control means, whereby said reversing valve may direct the flow of heat exchange medium from one coil to the other.

More particularly, it is an objective of the invention to provide such a heat recirculating apparatus having water heating means in said second housing, for collecting excess heat from said heat exchange medium, and using the same for heating hot water.

More particularly, it is an objective of the invention to provide a heat recirculating unit having the foregoing advantages incorporating water-to-air heat exchange means in said second housing, for circulating water to utilise geothermal heat as make-up heat.

The various features of the novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
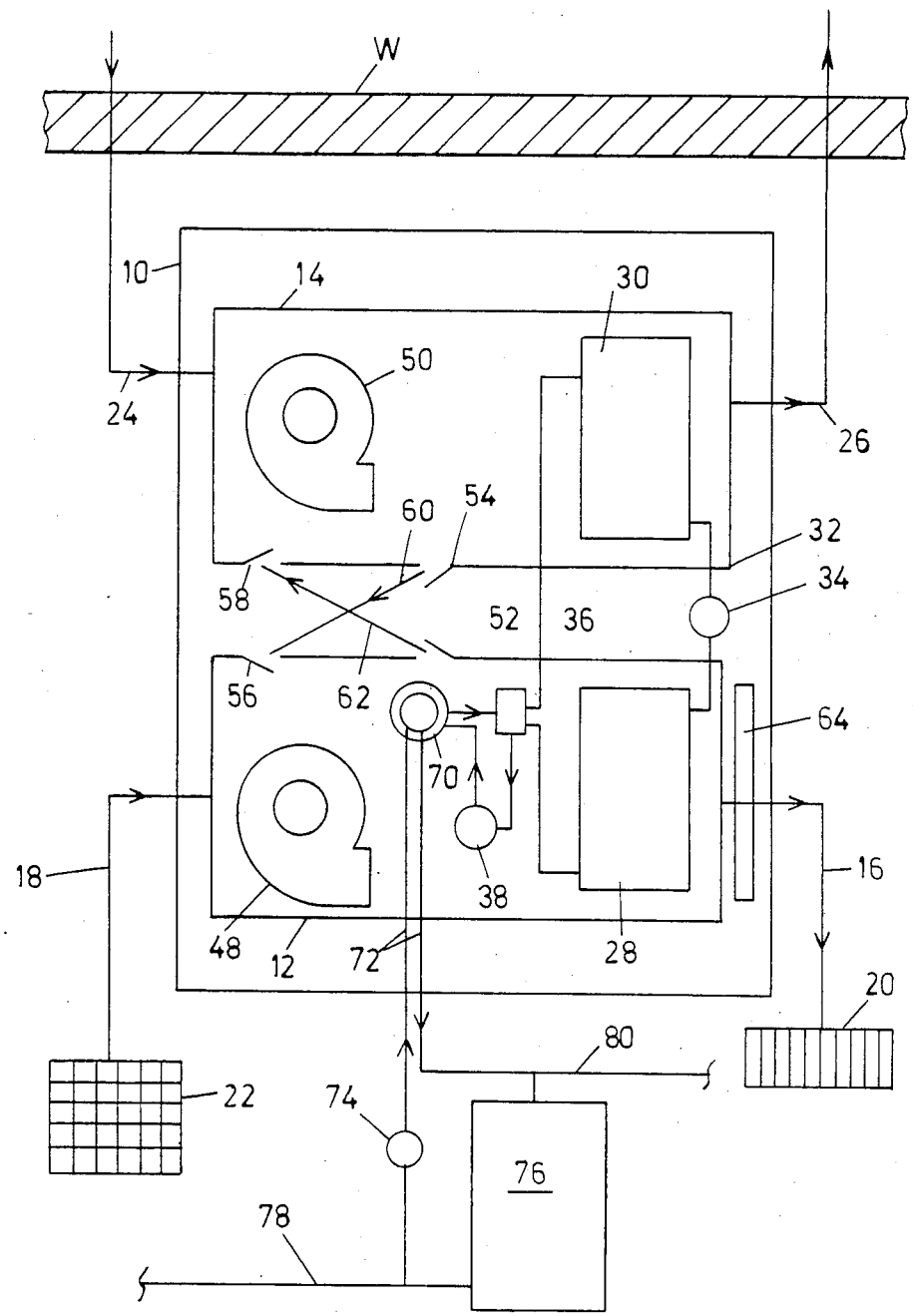
FIG. 1 is a schematic plan view of a heat exchanger unit in accordance with the invention.

The heat recirculation unit of the illustrated embodiment according to the invention is designed for use in any interior space, for heat recirculation between an inside atmosphere and an outside or exterior atmosphere.

The unit will usually be located inside the space. The unit may function independently, or may be part of an air circulating system including ducts, vents, and the like in the space.

As such, it may be considered as a replacement either individually or collectively for the conventional space heating furnace, central air-conditioning unit, and/or heat pump if provided, and domestic hot water heater, and fresh air exchanger (if provided).

Alternatively, the unit can be designed to feature as a retrofit unit to be attached to a portion of an air circulating system in a building. Air circulation may be provided by a building circulation fan operated constantly and independently of the unit, with the unit arranged in parallel, Referring now to FIG. 1, it will be seen that the invention comprises an integral rectangular container structure 10 defining a first or inside housing 12, and a second or outside housing 14, arranged side by side.

The two housings typically may be formed as a single rectangular container, but are shown as separate structures for the sake of clarity.

The two housings 12 and 14 thus form essentially elongated side-by-side parallel flow paths or ducts, within container 10 for flow of air.

Ducts indicated as lines 16 and 18 are connected to opposite ends of housing 12 (the inside housing) for connection to any suitable air circulation system, or simply for connection to air distribution and return registers indicated as 20 and 22 of any known design if desired. Similarly, ducts 24 and 26 are connected to opposite ends of housing 14 (the outside housing) for communication to an outside atmosphere, through a wall W.

It will of course be appreciated that the entire apparatus could be mounted in a suitable opening in a wall. Alternatively it could be mounted at some considerable distance inside the building, and the ducts 24 and 26 could be of considerable length.

It will of course be appreciated however that normally the entire unit will be located within the interior of the building, on the assumption that it is intended to retain heat within the building during colder weather, and reject heat outside the building during warmer weather.

However, where the unit is used in other situations, other than controlling the environment within a building, it will be appreciated that other considerations may apply so that this form of use and installation in this particular location is not.

Inner and outer housings 12 and 14 are each provided with a heat exchanger 28 and 30 respectively. The heat exchangers typically are in the form of heat exchange coils, consisting of continuous lengths of piping, equipped with heat exchange fins, such as are well known in the art.

Exchangers 28 and 30 are connected in series by pipe 32, and expansion unit 34.

Each of the coils 28 and 30 is connected to a common two-way. flow control valve 36.

A single compressor 38 is connected to the control valve 36, and is driven by a suitable electrical motor (not shown). Such compressors and motor drives are well known in the heat exchange art and require no further description.

The coils 28–30, valve 36 and compressor 38, and their various connecting pipes, which are not individually referenced, are all filled with a suitable heat exchange medium. Typically such a medium will be "Freon" (trade mark) gas of the type having a liquid and a gas phase. The operation of such a heat exchange medium by means of compressors, and coils is well known in the art, and requires no further specific description.

The compressor 38, by means of the control valve 36 supplies heat exchange medium to either coil 28 or to coil 30, and the heat exchange medium will then be transmitted from one such coil to the other via pipe 32 and valve 34 and back to the control valve 36, and back to the compressor 38.

In this way, chilled heat exchange medium may be supplied to one of the two coils, for extracting heat from the air flow therethrough, after which the heated medium is then passed to the other coil, where it may give up its heat to the air flow in that coil, and so on continuously.

Suitable control switching devices (not shown) are connected to the control valve 36.

In order to procure flow of air in the housings 12 and 14, fans 48 and 50 are provided. Fan 48 draws air from the duct 18 and forces it along inner housing 12 and out of the duct 16. Fan 50 draws air from duct 24 and forces it along outer housing 14 and out through duct 26.

The two fans are operated by separate electrical motors (not shown) and may also be controlled in any suitable manner, either continously, or on a discontinuous intermittent cycle, depending upon the needs of the particular situation.

The controls for such motors are not shown, and are well known in the art.

Air can be exchanged or transferred between housings 12 and 14, by means of transfer ports 52, 54, 56, 58. Ports 52, 54 are located downstream of respective fans 48, 49, and ports 56, 58 are located upstream.

The pressure differentials between the two housings at these two locations will cause air to transfer from low to high pressure. Suitable dampers may be provided as controls.

The ports are shown here as cross-connected by ducts 60, 62, so as to procure air exchange flow between areas of low and high pressure.

In order to provide auxiliary makeup heat, an electrical heater 64 may be provided in housing 10. Such an auxiliary electrical heater may consist simply of electrical elements located in the airstream, and they may be operated either automatically or manually as desired, depending upon the requirements of the situation. They are of a design well known in the art and require no further description.

In addition, in some circumstances it may be desirable to provide some form of air filters (not shown). These may be mechanical filters or may be electronic filters, or may be a combination of both, all of which are well known in the art and require no further description.

In many cases, where the unit is used in conjunction with a domestic air circulation system, it will be found that the system already has air filtration as part of the system, and accordingly no further filtration would be required in those cases.

Nonetheless, considering that exterior air will always be drawn in through the outer housing 14 it will generally speaking be desirable to have a filtration system at some point. In certain circumstances it may be desirable to provide additional filtration, where operating in a particularly contaminated atmosphere so as to keep dirt and contaminants out of the components in housing 14.

In accordance with an advantageous feature of the invention, excess heat generated in the unit may be retained and used, by means of the water heat exchanger 70. Water exchanger 70 is shown in conjunction with the conduit connecting with the "hot" side of compressor 38.

The details of heater 70 are not shown for the sake of clarity. Any form of heat exchanger would be suitable. Typically it would be a finned tube, with the tube carrying the refrigerant, and the water circulating through the fins.

Such a water heater 70 would be connected by water pipes 72 and pump 74 to a hot water tank 76.

In operation, assuming the unit is being used for air conditioning, in hot weather, the fans will both be operated. The compressor will be operated so as to supply chilled heat exchange medium to coil 28. This will thereby chill the interior air flowing along housing 12, and chilled air will thus be supplied through duct 16 to whatever location is required.

The heated heat exchange medium is then transferred by pipe 32 to coil 30, where it will give up its heat to air flowing along housing 14, and outwardly through duct 26. The interior air, flowing through housing 12, will normally be at a temperature slightly above the air ambient temperature inside the building or interior space. Thus, for example, where the interior temperature is desired to be kept at say 70° F., the air flowing in housing 12 might be at, for example, 74° F.

Outdoor air, flowing through housing 14, will be at an outside ambient temperature, for example about 90° F.

When operating under the heating cycle, the function of the coils is reversed by means of the control valve 36.

In this case, heat is extracted from outside air flowing through housing 14, and is added to the interior air flowing-in housing 12.

It will be observed that the two heat exchanger coils operate at relatively substantial temperature differentials, thereby producing the maximum efficiency in heat transfer.

Where additional heat is required in the building, then the electrical heater may supply such additional heat.

Under summer, or even moderate weather conditions, it will usually be found that there is an excess of heat generated in the system, and such excess heat can be used by water heat exchanger 70, to heat water, in the case of a home, or any hot water system or pool.

In warm weather, the water heat exchanger 70 assists the entire system, by removing some of the excess heat which would otherwise be rejected to atmosphere through coil 30. This additional heat is of course recycled back into useful heat in the building, which reduces the demand for fuel that would otherwise be used to heat for example the water supply, and also reduces the load on the coil in rejecting unwanted heat to the atmosphere.

Stale air is removed continuously from the interior air, and fresh air added from the outside air, by adjusting the air exchange ports 52, 54, 56, 58.

Note that in cooler weather, heating values in the inside air, which is vented in this way to the outside, are not lost to the system. Such inside air heating values are recovered as the inside air passes through the outside air heat exchanger 30, which thus recaptures such heat and returns it to the system.

Figure 2:
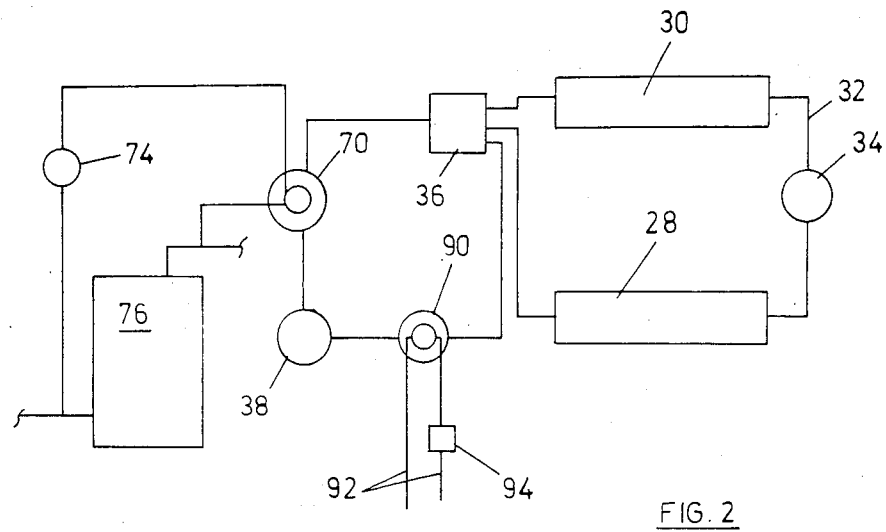
FIG. 2 is a block diagram of an alternate form of the heat exchanger unit of FIG. 1.

In accordance with a further embodiment shown in FIG. 2, additional make up heat may be obtained in cooler weather from other sources, e.g. the main water supply. For this purpose a further water heat exchanger 90 is located between compressor 38 and valve 36, on the "cold" side of compressor 38.

Water from the main water supply is passed through exchanger 90, by pipes 92.

A control valve 94 controls flow of water and is operated on demand in cooler weather. Valve 94 is operated by a suitable temperature sensor (not shown).

In this way additional heat can be recovered from the geothermal heat values in the mains water.

Water other than mains water or other fluids could also be circulated in various ways through exchanger 90, to use waste heat.

It will of course be appreciated that the disclosure of a reversing valve in the present application is purely by way of example for the purposes of illustrating the operation of the invention.

It will be apparent that there are other ways in which the same function as that of the reversing valve could be achieved if desired.

Figure 3:
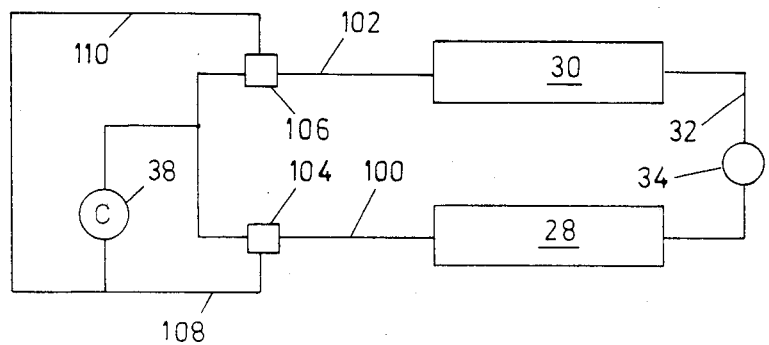
FIG. 3 is a schematic block diagram showing an alternate embodiment of a portion of the block diagram of FIG. 2.

For example, as shown in FIG. 3, it would be possible to provide two separate supply conduits 100 and 102 connected to respective heat exchangers, and to provide two separate flow control valves 104 and 106, and two separate return flow conduits 108 and 110 connected to the valves.

By suitable controls, one valve may be switched on and the other switched off, so the flow will take place from the compressor through the "on" valve into its connected heat exchanger, and will return from the other heat exchanger and back through the "off" valve to the compressor.

Figure 4:
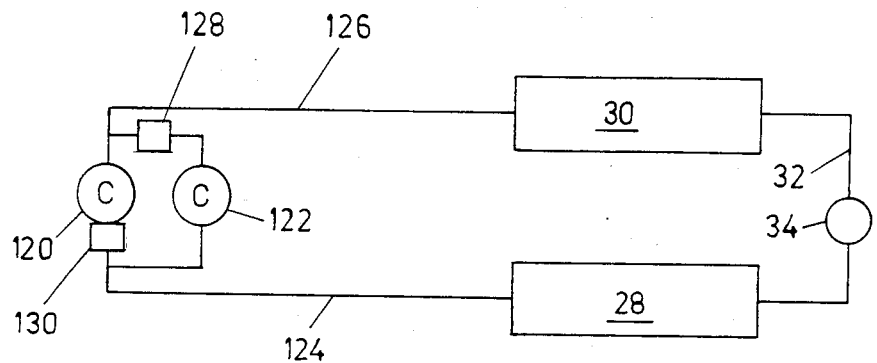
FIG. 4 is a schematic block diagram showing a further alternate embodiment of the same portion of FIG. 2, and, FIG. 5 shows an alternate layout.

A further alternate way of achieving the same result would be for example as shown in FIG. 4. In this illustration, two compressors 120 and 122 are provided, being arranged to pump heat exchange medium in opposite directions, and connected to the heat exchangers via conduits 124, 126.

Flow control valves 128 and 130 are provided for controlling flow.

By the operation of suitable controls, one compressor can be switched on and the other switched off, and simultaneously the appropriate flow control valves can be either opened or closed. In this way, one compressor can drive heat exchange medium to one heat vice versa.

It will thus be seen that the objective of the invention, namely selectively controlling flow of heat exchange medium either to one exchanger or to the other, can be achieved by various means other than the reversing valve shown in FIG. 2.

It will also be apparent that while the invention in FIG. 1 is illustrated in the form of simple rectangular housings defining two air flow paths which are parallel to one another, the invention is not restricted to this configuration. Clearly, the two air flow paths could be arranged in completely separate housings and could be directed parallel side by side in the same direction, or in a cross-flow configuration, or from an engineering point of view in the circumstances.

Figure 5:
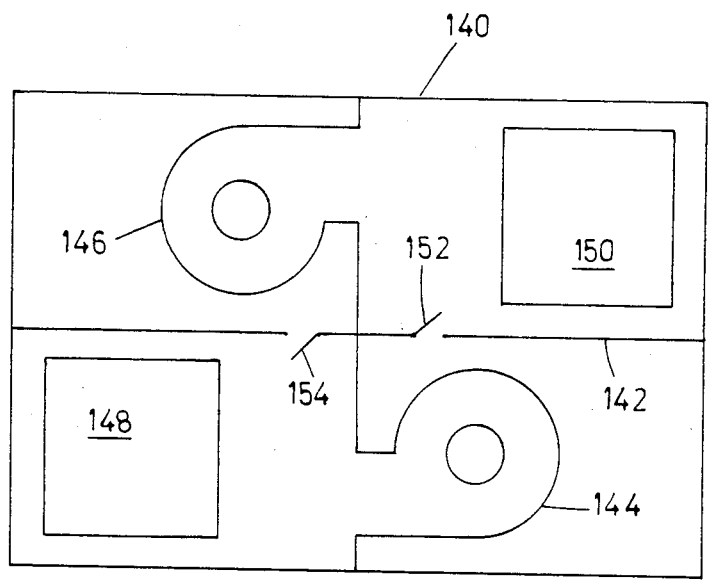

Thus, as shown in FIG. 5, the two housings may be formed as a single integral structure 140, divided into two by a partition wall 142.

Fans 144, 146 are arranged to provide air flows in opposite directions, through exchangers 148, 150.

Ports 152, 154 allow cross-flow of outside and inside air.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. The method of simultaneously regulating the temperature of inside air within an inside air space, and ventilating said inside air space with air from an outside air space and comprising the steps of:
    passing said air along a predetermined inside air flow path and through a fan and then through an inside heat exchanger downstream of said fan and returning said inside air to said inside air space;
    simultaneously passing outside air along an outside air flow path adjacent said inside air flow path, through a fan and then through an outside heat exchanger downstream of said fan, and returning same to said outside air space;
    extracting a portion of said inside air from said inside air path between said fan and said heat exchanger, and directing same to said outside air path upstream of said fan for venting to said outside air space through said heat exchanger;
    simultaneously extracting a portion of said outside air from said outside air flow path between said fan and said heat exchanger, and directing same to said inside air path upstream of said fan, and thence to said inside air space through said heat exchanger;
    continuously passing a heat exchange medium into one of said heat exchangers, and transferring said heat exchange medium from said one heat exchanger to the other of said heat exchangers, via expansion means, whereby to procure transfer of heat from one of said exchanger to the other; and
    passing said heat exchanger medium through compressor means and flow control means, to selectively direct said flow of heat exchange medium either to said one of said heat exchangers or to said other of said heat exchangers, whereby to procure transfer of heat from one said heat exchanger to the other selectively.

2. The method of regulating air temperature as claimed in claim 1 including the further step of passing said heat exchange medium through a domestic hot water heat exchanger, to remove heat from said heat exchange medium and to use said heat for heating water in said water heat exchanger.

3. The method of regulating air temperature as claimed in claim 1 including the further step of passing said heat exchange medium through a waste heat exchanger, to transfer waste heat from a waste heat medium passing through said waste heat heat exchanger, and to use said heat for heating said heat exchange medium.

4. The method of regulating air temperature as claimed in claim 1 including the step of passing said inside air through a supplementary heater for further heating the same.

5. The method of regulating air temperature as claimed in claim 3 wherein said waste heat medium is water.

6. A heat recirculating apparatus, for use in heating and cooling modes between an inside atmosphere, and and an outside atmosphere, and comprising:
    means defining an outside housing and an inside air housing, said outside air housing defining an outside air flow path and having a fan operable to cause flow of outside air therethrough, said outside air housing defining an area upstream of said fan of a low pressure, and an area downstream of said fan of a high pressure, and being adapted for connection to an outside atmosphere, and said inside air housing defining an inside air flow path and having a fan operable to cause flow of inside air therethrough, said inside air housing defining an area upstream of said fan of a low pressure and an area downstream of said fan of a high pressure, and being adapted for connection to an inside atmosphere;
    an outside air transfer passageway extending from said high pressure area of said outside air housing to said low pressure area of said inside air housing whereby outside air may be transferred to said inside air housing for circulation in said inside atmosphere;
    an inside air transfer passageway extending from said high pressure air of said inside air housing to said low pressure area of said outside air housing whereby inside air may be transferred to said outside air housing for venting to said outside atmosphere;
    means defining a heat exchange circuit including an outside heat exchanger in said outer air housing downstream of said outside fan and said outside air transfer passageway, and an inside heat exchanger in said inside air housing downstream of said inside fan and said inside air transfer passageway, said heat exchangers being connected with one another in series, via an expansion device, and compressor means operable to drive a heat exchange medium to either said heat exchanger selectively, said means returning to said compressor means via said expansion device and the other of said heat exchangers whereby heat may be transferred from said outside air to said inside air, and from said inside air entering said low pressure area of said outside air housing back to said inside air in heating mode, and whereby heat may be transferred from said inside air to said outside air, and from said outside air entering said low pressure area of said inside air housing, back to said outside air, in a cooling mode; and
    flow control means operable to direct said flow of said medium to one or other of said exchangers selectively, whereby to control transfer of heat exchange medium from one of said exchangers to the other selectively to provide heating or cooling modes as required.

7. A heat recirculating apparatus as claimed in claim 6 including axially heat exchange means for heating said heat exchange medium from a waste heat source, and means for circulation said heat exchange medium therethrough.

8. A heat recirculating apparatus as claimed in claim 6 including water heat exchanger means for collecting excess heat from said heat exchange medium, and using the same for heating a hot water system, and means for circulating said heat exchange medium therethrough.

9. A heat recirculating apparatus as claimed in claim 6 wherein said flow control means comprises a two-directional flow valve, and including conduit means connecting said compressor means to said valve, and conduit means connecting said valve to said heat exchangers, said valve being operable to direct heat exchange medium from said compressor means to one or other of said heat exchangers selectively, said medium returning from the other of said heat exchangers to said valve, and thence to said compressor means.

10. A heat recirculating apparatus as claimed in claim 6 including supplementary heating means in said inside air housing, operable to supply supplementary heat to said inside air.

11. A heat recirculating apparatus as claimed in claim 6 wherein said means defining said outside and said inside housing comprises an integral generally rectangular box-like housing, with a partition wall extending therealong dividing the same into two generally rectangular portions, one said portion defining said outside housing and the other said portion defining said inside housing, said inside and outside housings being separated solely by said partition wall, and wherein said outside air flow path extends along a predetermined first direction in said outside housing and said inside air flow path extends along a second axis parallel to and spaced from said outside air flow path, and in the opposite direction thereto, and including said inside and outside air transfer passageway in said partition.

12. A heat recirculating apparatus as claimed in claim 6 wherein said compressor means comprises two separate compressors, and conduit means connecting said compressors whereby a first said compressor directs heat exchange medium to said outside heat exchanger, and a second said compressor directs heat exchange medium to said inside heat exchanger, and including switch means for switching one of said compressors on, and the other off, and valve means for controlling flow to and from said compressors.

13. A heat recirculating apparatus as claimed in claim 6 including two separate flow control valves, one controlling flow to said outside heat exchanger, and the other said valve controlling flow to said inside heat exchanger, and means for operating said valves, and conduit means connecting said compressor means to said valve whereby heat exchange medium from said compressor means can be directed by said valves to one or other of said heat exchangers.

* * * * *